Patented Feb. 26, 1946

2,395,616

UNITED STATES PATENT OFFICE 2,395,616

POLYVINYL ALCOHOL COMPOSITION

Charles Dangelmajer, Nutley, N. J., assignor to Resistoflex Corporation, Belleville, N. J., a corporation of New York No Drawing. Application April 29, 1942,
Serial No. 440,969

7 Claims. (Cl. 260—36)

This invention relates to plastic compositions, and more particularly to compositions comprising polyvinyl alcohol and modifying agents which render the compositions normally flexible. The compositions of the present invention are an improvement over known compositions of this kind with respect to their retention of flexibility at sustained elevated temperatures.

Plastic polyvinyl alcohol compositions are suitable for the making of flexible tubes, hose, gaskets, washers, diaphragms, films, sheets, filaments, coatings and the like. They are particularly suitable for use in the handling of hydrocarbon fuels, oils and many organic solvents, by which they are unaffected.

It is particularly desirable that articles made of such compositions shall retain their desirable flexibility throughout a wide temperature range. Heretofore normally flexible articles of plastic polyvinyl alcohol compositions have hardened or become brittle when subjected to elevated temperatures for extended periods of time, as for example, in the case of a flexible tubing used to convey lubricating oil in an engine.

The object of the present invention is to improve the physical properties of compositions of the type described and particularly to increase their ability to withstand high temperatures without losing their flexibility.

In my Patent No. 2,246,915 I have disclosed that the incorporation in flexible polyvinyl alcohol compositions of the water soluble haloids of ammonium, of the alkali metals and of the alkaline earth metals greatly improve the stability of the compositions at elevated temperatures. I have now made further discoveries with respect to other materials which give even better results.

In accordance with the present invention it has been discovered that the incorporation in flexible polyvinyl alcohol compositions of certain heavy metal sulfates greatly increases their stability and increases the duration of their flexibility at elevated temperatures. Experiments with a large number of metal salts resulted in the surprising discovery that unique effects were produced by sulfates of copper and iron.

The effectiveness of the aforementioned sulfates with different polyvinyl alcohol compositions has been experimentally established and they have been found to be generally useful for increasing the duration of flexibility of such compositions at elevated temperatures. This effect is referred to herein as "thermostabilizing" and the means for effecting it as "thermostabilizing agents."

As is already known, flexible articles of various forms may be made, by molding, extruding, dipping and other procedures, from plasticized compositions of polyvinyl alcohol. Such compositions may also contain filling, coloring and other modifying ingredients, if desired. The term "polyvinyl alcohol" is used herein and in the claims to designate not only generically pure polyvinyl alcohol, which may be obtained in various modifications, but also such partial derivatives thereof as contain a sufficient number of unsubstituted hydroxyl groups as to render the compound soluble in water. For a fuller explanation, see Patent No. 2,111,272 of Paul M. Paulson, issued March 15, 1938. The polyvinyl alcohol used in the following examples was one of medium saponification number. It is preferred to use polyvinyl alcohols which are not completely saponified.

The examples given below contain novel combinations of ingredients, apart from the sulfates referred to, which are not claimed herein as they are the subject matter of my copending application Serial No. 346,150, filed July 18, 1940, and now Patent No. 2,340,866.

According to the present invention, polyvinyl alcohol is mixed with water, plasticizers, metal sulfate, and other ingredients, if any, to provide a material suitable for working up into finished articles by any desired process. The metal salt is dissolved in the water and added to the other ingredients in solution. In the examples, the formulae give mixes suitable for use in accordance with the process described in Schnabel Patent No. 2,177,612. After mixing, the ingredients are passed through rolls to form the material into strips. The temperature of the rolls may be varied within wide limits (15°–90° C.) depending upon the water content, the nature of the polyvinyl alcohol, the thickness of the strips, and on the ingredients of the composition. The strips may then be converted by extrusion or molding procedures into any desired form.

To more particularly describe the invention and to enable those skilled in the art to practice it, the following specific examples are given by way of illustration:

*Example 1*

A composition was prepared from the following ingredients:

| | Parts by weight |
|---|---|
| Polyvinyl alcohol | 100 |
| Glycerol | 35 |
| Formamide | 6 |
| Water | 40 |
| Cupric sulfate | 8 |

The cupric sulfate used was $CuSO_4 \cdot 5H_2O$. It was first dissolved in the water, admixed with the glycerol and formamide and the resulting solution was then evenly distributed in the dry powdered polyvinyl alcohol which was thereafter processed to provide molded sheet material for test purposes.

*Example 2*

A molded composition was formed as in Example 1 from the following ingredients:

| | Parts by weight |
|---|---|
| Polyvinyl alcohol | 100 |
| Glycerol | 35 |
| Formamide | 6 |
| Water | 40 |
| Ferrous sulfate | 8 |

The ferrous sulfate used was $FeSO_4 \cdot 7H_2O$.

Test strips of the material of the foregoing examples were tested for their resistance to sustained high temperatures by submerging them in an oil bath maintained at a temperature of 124°–126° C. They were removed at 24 hour intervals and bent 180 degrees around a rod of ⅜" diameter, once in each direction, and then returned to the bath unless bending produced fracture.

Using as a basis of comparison the composition of Example 6 of my Patent No. 2,246,915, in which the thermo-stabilizing agent was ammonium chloride, the results were as follows: The material of Example 1 was slightly superior to that of said Example 6 in duration of flexibility; the material of Example 2 had a duration of flexibility approximately seven times as long as that of Example 6.

In some applications, as for example where the polyvinyl alcohol composition is used in contact with metal, the material of Example 1 may not be suitable for use because of the corrosive effects of cupric sulfate.

The material of Example 2 containing ferrous sulfate, is superior in its ability to withstand elevated temperatures to any polyvinyl alcohol composition hitherto developed. When it was attempted to extrude this material, however, it was found to have a very high viscosity and to be very difficult to extrude. It was found that the material could be further modified, without losing its heat resistant properties, by the addition of sorbitol, mannitol or sugar so as to be readily extrudible. The following is an example of such a formula:

*Example 3*

| | Parts by weight |
|---|---|
| Polyvinyl alcohol | 100 |
| Glycerol | 36 |
| Formamide | 8 |
| Water | 48 |
| Sorbitol | 7 |
| Ferrous sulfate | 3 |
| Aluminum chloride | 2 |

The sorbitol improves the flowing properties of the composition at elevated temperature and pressure such as exist during extrusion. The aluminum chloride was used because of its peculiar property of preventing blister formation in the material at temperatures as high as 150° C., as explained in my copending application Ser. No. 441,275, filed on May 1, 1942.

While the examples give the quantity of heavy metal sulfate as 3% or 8%, based on the weight of the polyvinyl alcohol, the quantities may be varied within a range of from about 3% to 15%, for practical results. In general the thermo-stabilizing effect increases with an increase in the amount of the sulfate used. In like manner, in compositions for extrusion, the sorbitol, mannitol or sugar will be used in proportion to the amount of ferrous sulfate to produce the desired consistency, usually within a range of from about 3% to 17%. Of these modifying agents sorbitol has been found to produce the best results.

The practical advantages of the present invention are many. Polyvinyl alcohol compositions have varied applications in industry as parts of many kinds of apparatus, equipment and machinery in the form of hose, tubing, gaskets, diaphragms, coatings, packing and the like. Such parts may be used in pumps, valves, hydraulic systems, internal combustion engines, various kinds of machinery, etc. In such applications it may be required that the polyvinyl alcohol compositions withstand continued high temperatures, as for example when parts formed from such compositions are part of the lubricating or fuel supply system of an engine. By increasing the duration of flexibility or the stability of the compositions at elevated temperatures, their range of usefulness is greatly increased and they are rendered adaptable to various fields in which it has not hitherto been practical to use them.

The invention is not limited to the detailed examples herein given by way of illustration but may be modified in various ways within the purview of the claims.

What is claimed is:

1. A normally flexible plasticized polyvinyl alcohol composition containing as a thermostabilizing agent a substance selected from the group consisting of the sulfates of copper and iron.

2. A normally flexible plasticized polyvinyl alcohol composition containing as a thermostabilizing agent cupric sulfate.

3. A normally flexible plasticized polyvinyl alcohol composition containing as a thermostabilizing agent ferrous sulfate.

4. A normally flexible plasticized polyvinyl alcohol composition containing as a thermostabilizing agent a substance selected from the group consisting of the sulfates of copper and iron, said substance being present in an amount sufficient to increase the duration of flexibility at elevated temperatures.

5. A normally flexible plasticized polyvinyl alcohol composition containing as a thermostabilizing agent from about 3% to about 15% of cupric sulfate, calculated on the amount of the polyvinyl alcohol.

6. A normally flexible plasticized polyvinyl alcohol composition containing as a thermostabilizing agent from about 3% to about 15% of ferrous sulfate, calculated on the amount of polyvinyl alcohol.

7. A normally flexible plasticized polyvinyl alcohol composition adapted for extrusion containing as a thermostabilizing agent ferrous sulfate and a substance selected from the group consisting of sorbitol, mannitol and sugar.

CHARLES DANGELMAJER.